Figure 1A:
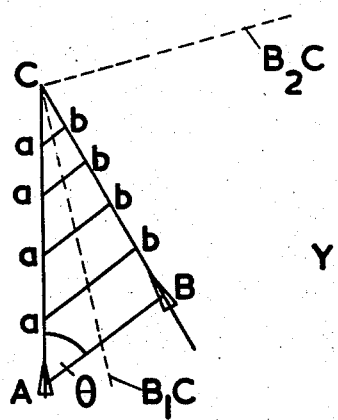

March 17, 1964  E. S. CALVERT  3,125,740
PLAN POSITION INDICATING APPARATUS
Filed Aug. 1, 1960  4 Sheets-Sheet 1

*Inventor*
EDWARD SPENCE CALVERT
By Larson and Taylor
Attorney

March 17, 1964  E. S. CALVERT  3,125,740
PLAN POSITION INDICATING APPARATUS
Filed Aug. 1, 1960  4 Sheets-Sheet 2

March 17, 1964     E. S. CALVERT     3,125,740
PLAN POSITION INDICATING APPARATUS
Filed Aug. 1, 1960     4 Sheets-Sheet 4

Inventor
EDWARD SPENCE CALVERT
By
Larson and Taylor
Attorney

United States Patent Office 3,125,740
Patented Mar. 17, 1964

3,125,740
PLAN POSITION INDICATING APPARATUS
Edward Spence Calvert, Camberley, England, assignor to National Research Development Corporation, London, England
Filed Aug. 1, 1960, Ser. No. 46,774
Claims priority, application Great Britain Aug. 5, 1959
9 Claims. (Cl. 343—10)

This invention relates to radar and other plan position indicating apparatus.

With conventional relative motion display type plan position indicating apparatus as now in common use it is much easier to interpret the "picture" in the case of a fixed installation, e.g. a harbor radar, than it is in the case of a moving installation, e.g., on a ship or aircraft. In both cases positions of indications or images in the picture, i.e., their bearings and distances from the central intersection of the usual top to bottom and side to side X—X and Y—Y reference lines correspond to positions, i.e., bearings and distances, of corresponding objects relative to the position and orientation or bearing of the installation which is virtually a reference framework that is represented by the X—X, Y—Y intersection. In the "fixed" case, therefore, the velocity of an indication corresponds to the true velocity (i.e., relative to the earth) of the object, but in the moving case the velocity of an indication corresponds to the true velocity of the object plus the true velocity of the installation (both relative to the earth) added vectorially. In consequence, not only is the bearing of an indication with respect to the X—X, Y—Y reference lines dependent upon the heading, for example of a ship in which the apparatus is installed, but also its position with respect to the X—X, Y—Y reference lines is dependent upon the speed, for example of a ship in which the apparatus is installed. In the fixed case there is a reference framework, represented by the X—X, Y—Y lines, that is fixed both with respect to the earth and to the plan position indicator. In the moving case the reference framework is fixed to the installation and moves both in orientation with heading change and translationally with change of position of a ship or craft in which the apparatus is installed.

It has been proposed to "heading stabilize" the indications or images and so prevent them from swinging around the X—X, Y—Y intersection as and when the ship or craft carrying the installation changes heading, by imparting thereto angular motion about the X—X, Y—Y intersection, which is equal to the heading change but in the opposite sense. With such heading stabilization the reference framework represented by the X—X, Y—Y lines is fixed as regards its orientation or bearing but said framework still moves translationally with the ship or craft carrying the installation.

For the sake of simplicity the ship or craft in which the plan position indicating apparatus is installed is referred to hereinafter simply as "own craft."

Whether or not heading stabilization as mentioned above is provided a possible collision of another craft with own craft, or what might actually prove to be a near miss, is shown in a relative motion display by the indication of the other craft appearing to be moving towards the center of the picture radially thereof, for this means decreasing range and constant bearing of the other craft relative to own craft. It will be understood that normally ships at sea and aircraft keep to selected, straight, constant-speed, courses, i.e., they normally maintain both heading and speed constant.

Although heading stabilization is a good thing because it prevents the indications from swinging around with own craft heading change, a relative motion display does not give a practically useful indication of the effect upon a possible collision situation, of any manuever taken by own craft with a view to reducing the risk. The velocity of any other craft image depends on the vector sum of the true velocities of own craft and of the other craft (both with respect to the earth) and there is no reference framework with respect to which these two velocities can be estimated or judged separately. The relative motion display does not provide sufficient information to enable the observer to decide what would be a successful avoiding manuever for any particular risk that is indicated by it.

It has also been proposed to modify the picture so that it shows the position of own craft as well as the positions of any others near it in the same way as on a chart or map, i.e., with respect to a reference framework that is fixed, as regards heading or bearing and position relative to the earth, as in the case of a harbor radar where the apparatus itself is fixed, in orientation and position. This may be done by providing heading stabilization as set forth above, moving an additional indication or image representing own craft in the picture in accordance with the true velocity (relative to the earth) of own craft and also adding the velocity of said own craft indication to the velocity of the indication(s) of any other craft. This chart motion display does have a reference framework (represented by the X—X, Y—Y reference lines) against which the true velocities of own craft and other craft can be judged separately, but with this display it is unfortunately, only possible to estimate the velocity of one craft relative to another by imagining a straight line joining the corresponding indications in the picture and judging how the length and orientation of this imagined line are changing. Thus, although a chart motion display clearly indicates instantaneous situations, it affords no directly useful indication as to whether or not a changing situation is becoming less or more dangerous as regards possible collision.

According to the invention in plan position indicating apparatus for marine or air craft use and having the usual relative motion display whose reference framework is fixed with respect to own craft there are provided means for imparting motion to the indications of craft in the display and which are operable at will not only to stabilize the reference framework of the display in azimuth on a constant heading the same as an initial heading of own craft but also to impart to said reference framework a constant translational velocity the same as an innitial translational velocity of own craft, and also means affording in the display an indication of own craft.

Thus provision is made for indicating own craft in the display and for so modifying the display at will that the reference framework commonly represented by conventional X—X, Y—Y reference lines, has not only a fixed heading but also a constant translational velocity relative to the earth the same respectively as an initial heading and an initial straight constant-speed course of own craft, the display when so modified indicating with respect to such fixed heading constant translational velocity reference framework, the ranges and bearings not only of other crafts seen but also of own craft, and the indication of own craft remaining stationary so long as own craft maintains said initial course but being displaced in accordance with departure of own craft from said initial course.

Regarded in another way, plan position indicating apparatus according to the invention has means for indicating own craft in the display, means for producing and imparting at will to the indication of own craft a velocity in accordance with the vectorial difference between own craft's velocity when own craft is maintaining an initial, straight, constant-speed course and own craft's velocity when off said initial course, means for adding at will this same difference velocity vectorially to the velocity(ies) [when own craft is maintaining said initial course] of the indication(s) of any other craft, and means for imparting at will to the own craft indication and also to the indication(s) of any other craft heading stabilizing angular motion in accordance with heading change of own craft but of opposite sense thereto, whereby the display remains unchanged with the own craft indication central so long as own craft maintains the initial course and the indication of own craft as well as the indication(s) of any other craft show at any instant when own craft is off said initial course the ranges and bearings of the corresponding craft relative to the position which own craft would have occupied at that instant had it not departed from the initial course.

In other words the apparatus has means for effectively imparting to an indication of own craft and to the indication(s) of other craft in the display a drive in accordance with the vectorial difference of an initial velocity of own craft and any changed velocity thereof as regards translational motion thereof, and also a drive in accordance with the difference of an initial heading and any changed heading thereof as regards orientational motion thereof.

The plan position indicating display indicates or can be made to indicate own craft as well as other craft and appears or can be made to appear, when own craft has departed from an initial constant heading and straight, constant-speed course, just as it would have done if the apparatus had actually continued (say in the ship's launch) on said initial heading and course.

In a case, for example, where the indications appear at the face of a cathode ray tube which is viewed through a fixed frame carrying cross-wires which represent the X—X, Y—Y reference lines and intersect at the center of the frame, this drive is such as could be produced (although this is unlikely in actual practice) by swinging the tube about a point on its axis some distance behind its face for the translational motion and rotating the tube about its axis for the heading stabilizing or orientational motion.

The own craft indication may be a cathode ray tube image or an index member which is moved mechanically. In general, however, it is preferable that all the indications should be cathode ray images produced and positioned by techniques such as will be apparent to those skilled in the cathode ray tube field.

The display as such remains unaffected when the drive is applied until own craft departs from its initial constant heading and straight, constant-speed course, for, until it does so the above mentioned vectorial difference velocity is zero. Moreover, the only effect upon the picture when own craft does depart from said initial heading and course is that the own craft indication moves away from the X—X, Y—Y intersection at the center of the picture so that its position at any instant shows directly the bearing and range of own craft with respect to the position (now represented by the X—X, Y—Y intersection) in which it would have been at that instant if it had not so departed.

Preferably, as the presentation according to the invention is heading stabilized and so does not rotate with respect to the X—X, Y—Y reference lines as own craft's heading changes, provision is made for indicating own craft's heading. For this purpose the own craft indication may be of elongated form or otherwise such that its orientation with respect to the X—X, Y—Y reference lines can readily be seen and means may be provided for changing its orientation in accordance with change of heading of own craft. Alternatively, and especially when the own craft indication is a cathode ray tube image, a separate heading index may be moved around the picture as own craft's heading changes, for example about the X—X, Y—Y intersection and over a graduated circular frame or bezel surrounding the picture.

Figure 1B:
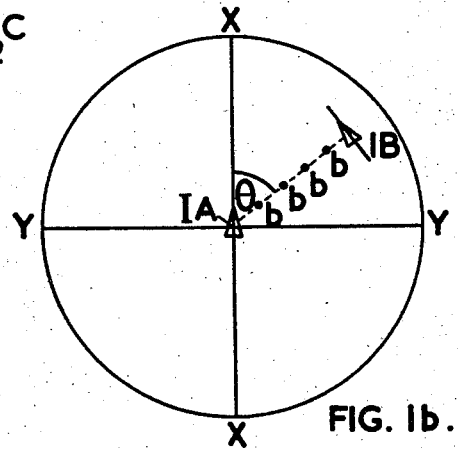

The invention is more fully explained with reference to the accompanying drawings which are diagrammatic and not to scale:

FIGURES 1(a) and 1(b) show as on a chart or map and as seen in a normal relative motion plan position display respectively, a situation involving own craft and one other craft on courses likely to lead to a collision between them.

Figure 2A:
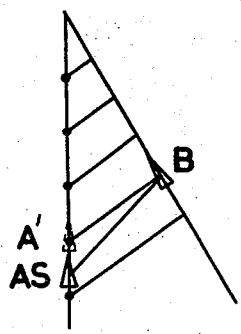
Figure 2B:
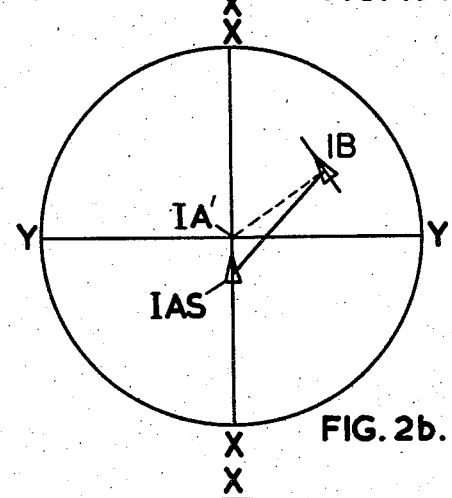

FIGURES 2(a) and 2(b) show as on a chart or map and as seen in a display according to the invention, respectively, the changed situation when own craft simply decreases speed.

Figure 3A:
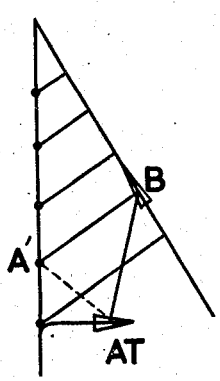
Figure 3B:
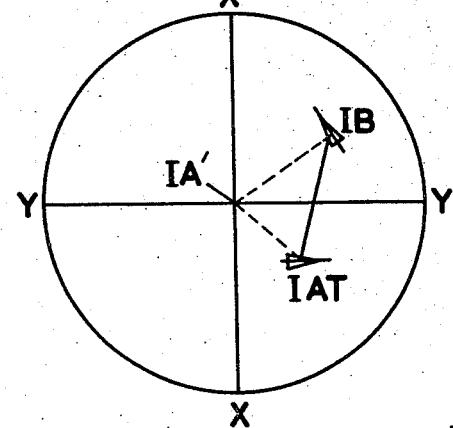
Figure 4A:
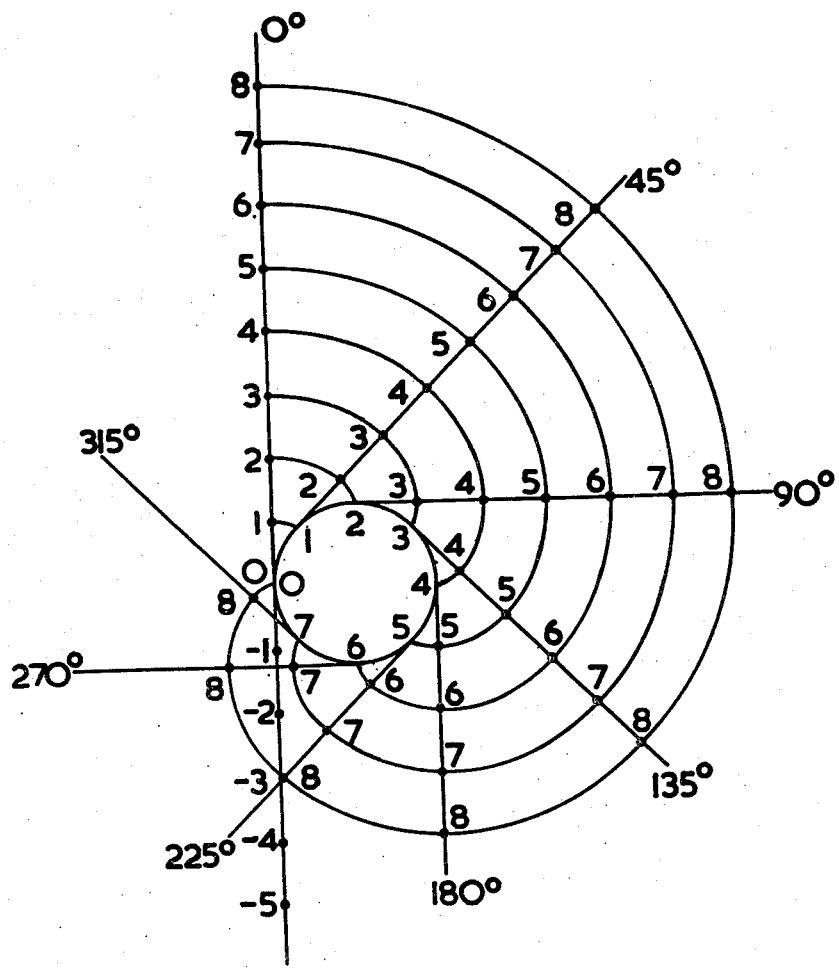
Figure 4B:
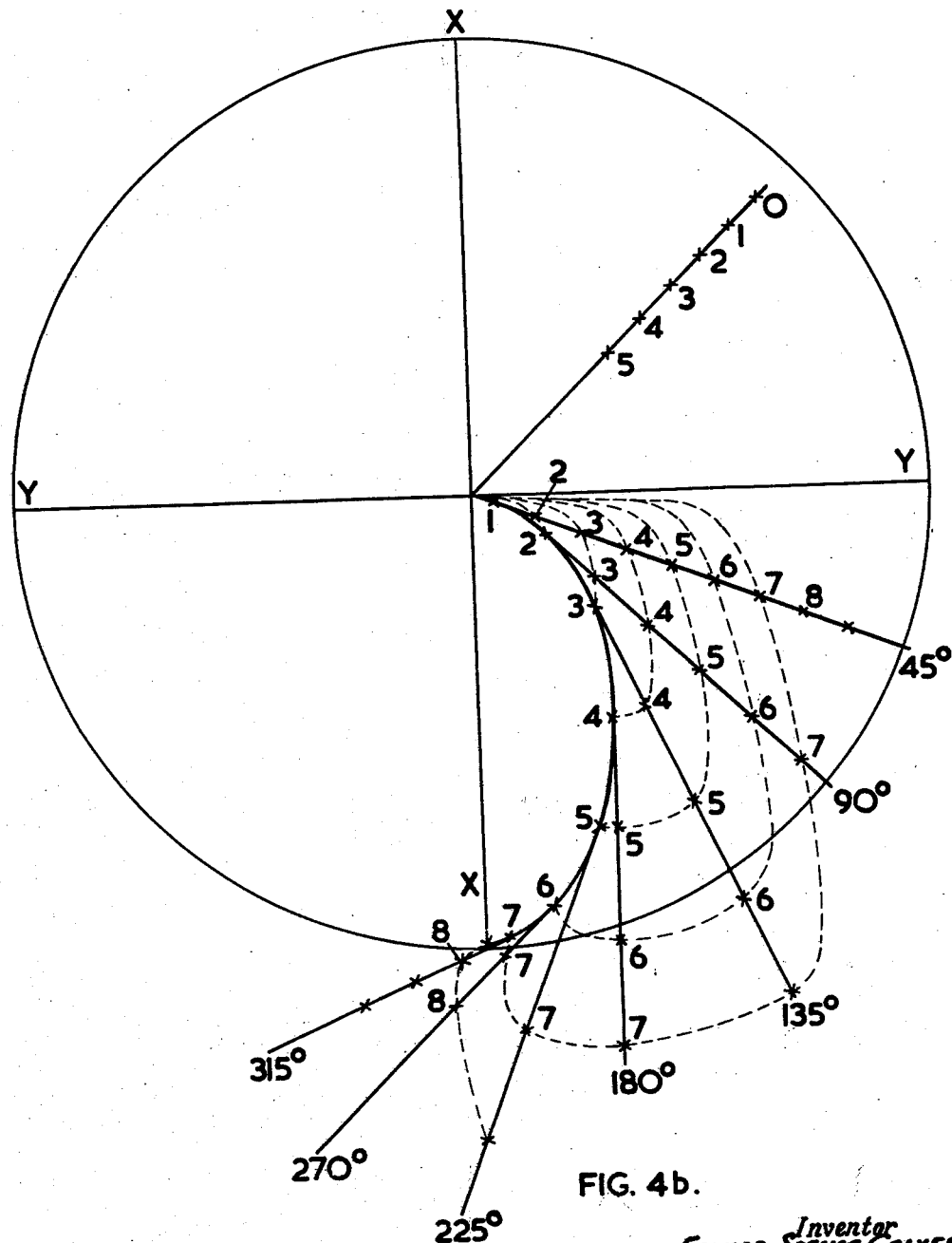

FIGURES 3(a) and 3(b) show similarly the changed situation when own craft turns 90 degrees to starboard and FIGURES 4(a) and 4(b) are diagrams showing as on a chart or map and as seen in a display according to the invention, respectively, positions reached after equal time intervals by turning at constant radius through different angles to corresponding new straight courses without any change of speed.

Figure 5:
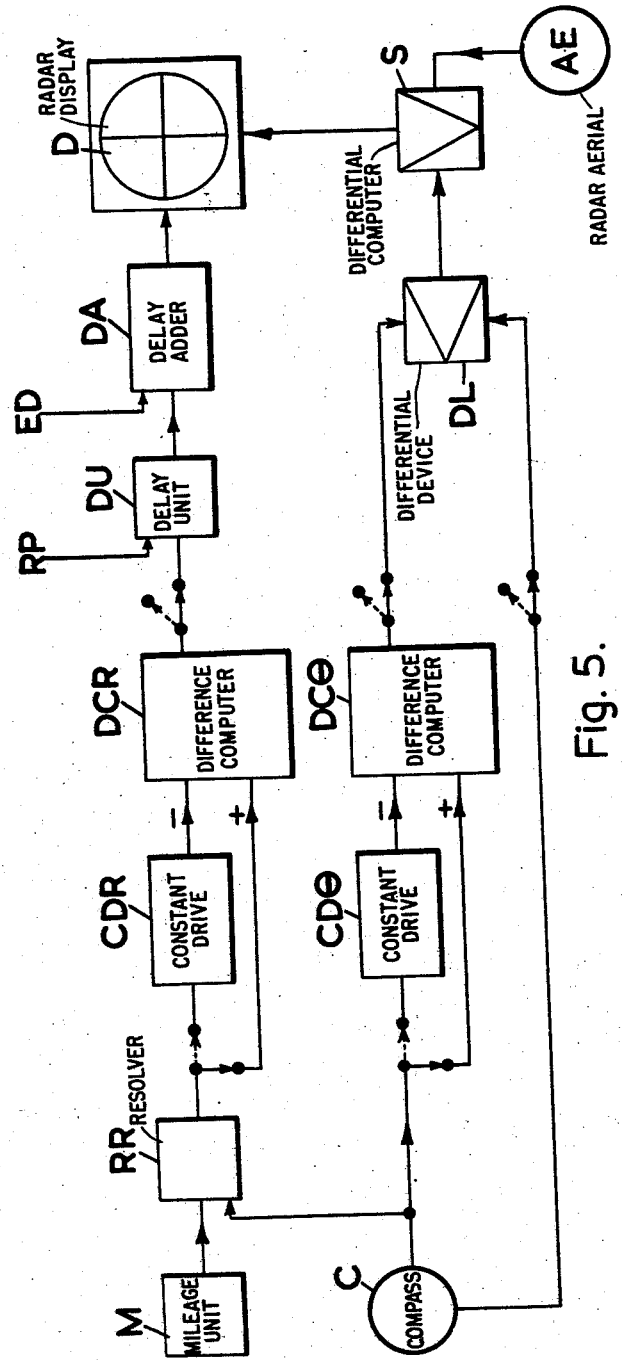

FIGURE 5 is a schematic diagram of an arrangement for providing a non-radar indication of own craft and for imparting drives to this and to the radar indication(s) of any other craft, in the case of a radar plan position indicating apparatus.

FIGURE 1(a) shows, as on a chart or map, own craft A carrying a conventional relative motion plan position indicating radar and which is maintaining a straight, constant-speed, course AC and a second craft B which is maintaining a straight, constant-speed, course BC which is one of the many indicated by the broken lines B1C and B2C that will result in the two craft meeting or colliding at the intersection C.

The angle $\theta$ between own craft A's course AC and the straight line through simultaneous positions A and B of the two craft is the bearing of other craft B relative to craft A and the length of this line AB is the range or distance of other craft B from own craft A at any instant. In the conventional relative motion plan position presentation or display on own craft A, see FIG. 1(b) in which the usual fixed up and down and side to side reference lines are indicated at X—X and Y—Y, respectively, the indication corresponding to other craft B appears as a bright area or spot (which is often far from circular) centered on the point IB which is at a distance from the center IA (representing own craft A) corresponding to the range AB in FIGURE 1 and on a radius inclined to the reference line X—X at the angle $\theta$ of FIGURE 1(a).

As stated above, the courses AC and BC are both straight and at constant speed such that the craft A and B will meet at the intersection C; because of this, straight lines A—B and a—b, a—b . . . FIGURE 1(a), joining successive positions a, a . . . occupied by own craft A to positions b, b . . . successively occupied by other craft B at the same instants in time, are parallel to one another and of steadily decreasing length, and, the image-point IB, FIGURE 1(b), moves steadily inwards along the same radius, for as its range decreases the bearing of other craft B remains the same.

It is this unchanging relative bearing of other craft B that is indicative of collision danger and, clearly, it is easier to detect whether or not the relative bearing is remaining constant in a relative motion presentation like FIGURE 1(b) than it is in a chart or map presentation like FIGURE 1(a), bearing in mind that it is only the indication area or spot centered on the point IA and the indications A and B that appear on the two displays, respectively, the courses and bearing angles in FIGURE 1(a) and the radius in FIGURE 1(b) having to be estimated by the observer.

If an observer of either display decides that the relative bearing is continuing constant, craft A can remove the collision danger by turning and/or changing speed, but such a decision is difficult to make with a chart or map display, FIGURE 1(a), and, any change of heading causes the images such as IB FIGURE 1(b) to swing round with respect to the X—X, Y—Y reference lines.

According to the present inventtion not only is such swinging of other craft images prevented but a moving indication of own ship is added to the relative motion picture to show its departure from initial straight, constant-speed, course.

To explain this more fully and referring firstly to FIGURES 2(a) and 2(b), suppose that own craft A departs from its initial straight, constant-speed, course simply by decreasing speed, then after a given time interval it will be at the position AS FIGURE 2(a) instead of position A¹ where it would have been if it had not slowed down. This situation will appear in a display according to the invention as in FIGURE 2(b) in which IB is still on the same radius to the center which now represents the position which own craft A would have reached if it had not decreased speed and indication IAS of own craft A is on the reference line X—X at a point below its central intersection with reference line Y—Y, which point is labelled IA¹ in FIGURE 2(b).

Referring secondly to FIGURES 3(a) and 3(b), suppose now that own craft A departs from its initial straight, constant-speed, course simply by turning to starboard, then after a given time interval it will be at the position indicated by AT FIGURE 3(a) instead of position A¹ where it would have been had it not turned right. This situation will appear in a display according to the invention as in FIGURE 3(b) in which IB is still on the same radius from the center IA¹ which now represents the position of own craft A had it not turned right, and an indication IAT of own craft A is to the right of the reference line X—X at a point below the reference line Y—Y.

Diagrams similar to those just described can be produced for all possible collision courses as will be apparent to those skilled in the art, and it will be clear from the above that a display according to the invention provides a useful indication as to how an initially potentially dangerous situation is being changed by avoiding action or by maneuver of any or all the craft involved. The display according to the invention shows the avoiding motion of own craft as well as the motion (quite undisturbed from its conventional relative motion plan position indicator showing) of any other craft, both relative to a common reference framework or datum which is represented by the usual X—X and Y—Y reference lines and the usual datum mark at their intersection at the center of the picture and which latter may be regarded as the ghost of own craft continuing on its initial straight, constant-speed course.

The drive according to the invention may be made operative only when required and its only effect upon the picture as such is to add a movable indication of own craft; at the same time, of course, causing the usual fixed central reference mark to represent its phantom or ghost.

Turning now to FIGURES 4(a) and 4(b) of the drawings, assuming that there is no tide or other current so that the true direction of travel of a craft is the same as that in which it is pointing, i.e., as its heading as shown by the compass, and also ignoring any side-slip while turning, then, as shown on a chart or map, craft proceeding on a straight, constant-speed, course will pass through positions such as —5, —4, —3, —2, —1, 0, 1, 2, 3, 4, 5, 6, 7 and 8 on the vertical line marked 0° in FIGURE 4(a). If on reaching the point 0 the craft, without any change in speed (instead of proceeding straight on) turns at constant radius, then, for a particular radius and a particular constant speed, it will after the next equal time interval have turned through 45° and reached the next "time position" 1 on a circle of the radius in question; it will have turned through 90° and reached the next time position 2 on the circle after the next time interval; and so on, until after the eighth time interval it will have turned through 360° and reached the time position 8 which position is the same position 0 at which the turning began. If the craft turned through 45° only and then continued straight ahead, without any change in speed, it would leave its circular turning path at time position 1 on the circle and at the same equal time intervals pass through time positions 2, 3, 4, 5, 6, 7 and 8 along what may be called a "turn line" marked 45° in FIGURE 4(a), and, similarly, pass at the same time intervals through time positions 3, 4, 5, 6, 7 and 8 on a 90° turn line, through time position 4, 5, 6, 7 and 8 on a 135° turn line, time positions 5, 6, 7 and 8 on a 180° turn line, time positions 6, 7 and 8 on a 225° turn line, time positions 7 and 8 on a 270° turn line and time position 8 on a 315° turn line, reaching time position 8 on the circle for a 360° turn. Time positions for intermediate turn lines, which latter are not shown for the sake of clarity, are indicated by what may be called "isotime" lines drawn smoothly through time positions of the same number on the circle and on the 0°, 45°, 90°, 135°, 180°, 225°, 270° and 315° turn lines in FIGURE 4(a).

FIGURE 4(a) shows the equal time interval positions as they would appear on a chart or map, that is to say with respect to a fixed reference framework (i.e., reference axes which are fixed relative to the earth). FIGURE 4(b), however, shows precisely the same time positions as they appear in a display according to the invention, that is to say with respect to a moving reference framework whose orientation and velocity with reference to the earth are the same as the heading and true velocity with reference to the earth of the craft before it began to turn at the time position 0. In this display [FIGURE 4(b)], the circular path [FIGURE 4(a)] of own craft back to the point at which it began to turn appears as a cycloidal curve with the equal time interval positions spaced along it at different distances determined by own craft's velocity relative to that of the moving reference framework, i.e., relative to where own craft would have been if it had continued on its initial course [along the line 0° of FIGURE 4(a)], all time positions in which initial course appear at the point 0 at the center of FIGURE 4(b) instead of at equal distances apart as in the chart or map presentation [along the line 0° in FIGURE 4(a)].

Also in the moving reference diagram FIGURE 4(b) all the turn lines extend downwardly from the point 0 and the isotime lines are displaced correspondingly downwards from where they appear in FIGURE 4(a). However, these isotime lines of FIGURE 4(b) indicate just how far it is possible for own craft to move away (without changing speed) in a given time from the position it would reach in that time if it kept straight on. In general, the optimum avoiding action for own craft to take will be to turn on to a turn line that extends at right angles to a radius along which it is estimated that the indication of another ship is approaching the X—X, Y—Y intersection at the center of the picture, except that where the other craft indication appears to be approaching along a radius from abeam near to the Y—Y reference line the most effective avoiding action is to change speed.

The display according to the invention is heading stabilized and thus if, for example, the initial straight course before avoiding action of own craft is due North, then in the picture the top (i.e., the upper end of the reference line X—X) represents North and will continue to represent North when own craft manuevers and an indication thereof moves away from the central intersection of the reference lines X—X and Y—Y.

As an appreciable time will elapse between the initiation of any avoiding action of own craft, and any resultant translational movement of the indication of own craft, and as that initiation will, in general, be a heading change, it is desirable in practice to provide some indication of own craft's heading in the display according to the invention. Ideally, this could be done by means of an elongated, or other, e.g., arrow, shaped image in the picture but as this may be impossible to provide when the own indication is a cathode ray tube image, a separate index for indicating heading may be displaced around the rim or frame of the picture from the top as the own craft heading is changed from its initial straight, constant-speed, course heading, or, alternatively, instead of a cathode ray tube image, the own craft indication may be comprised by an appropriately shaped index which is displaced bodily to show departure from course and is also oriented in accordance with own craft heading change by mechanical or other means. Any such indication of heading change would be preferable to the operator having to use a compass to compare own craft's heading during avoiding action with its initial straight, constant-speed, course heading.

A diagram like FIGURE 4(b) may be provided for the guidance or assistance of the user of a plan position indicating apparatus with a display according to the invention. This could be prepared, for example, to suit the usual cruising speed and the maximum rate of turn at that speed of craft or, with any given installation, several such diagrams prepared for different speeds and different rates of turn could be provided. Again, such a diagram could be drawn to an appropriate scale on a transparency arranged to be mounted, for example so as to be readily interchangeable with another, in front of a cathode ray tube screen to enable the latter to be viewed with the diagram superposed upon it.

As will be apparent to those skilled in the art the means employed in any particular case actually to impart or produce the motions or drives according to the invention may take various forms irrespective of the means used to constitute the display or picture itself and signals used to control the operation of said means may be derived in various ways from navigational apparatus. For example, see FIGURE 5 of the drawings in which a radar display unit is indicated at D, a compass unit at C, and a mileage unit at M. All of these and the other units employed may be of known type to perform the functions required of them as will become apparent to those skilled in the art from a perusal of what follows.

Considering first the translational drive in range "R," i.e., the distance of own or any other craft indication from the center of the display, signals from the mileage and compass units M and C are fed to a resolver RR to provide a range signal corresponding to distance of own craft from an initial position prior to the application of drives to the indications on the display unit D. Before the drives are on, this range signal is applied to a constant drive unit CDR whose output signal is the same as its input but reversed in sign and, moreover, continues when its input is disconnected to provide a constant output the same as at the instant of disconnection of its input. When the drives are on the output from the resolver RR is switched from the input of the unit CDR to a difference computer DCR to which the now constant output of the unit CDR is also applied. The output from the difference computer DCR corresponds to the difference in range from the position of own craft at switching on, between subsequent positions occupied by own craft at given time intervals (whether or not it changes course) and the positions it would have occupied at said time intervals if it had not changed course. (When own craft does change course these latter positions may be regarded as positions occupied by own ship's ghost, when it does not change course they are actual positions of own craft and the range difference is zero.)

For producing the indication of own craft in the display unit D the radar pulses are fed in, as indicated at RP, to a delay unit DU whose output is in the form of pulses of the same repetition rate delayed by a time interval corresponding to the output of the difference computer DCR which is also applied to the delay unit DU. These non-radar, delayed pulses are fed to a delay adder unit DA from which they pass unchanged to the display unit D. The echo delayed pulses from the radar receiver (not shown) are fed, as indicated at ED, to the delay adder unit DA by which the delay of the non-radar (own craft) pulses is added to their existing echo delay before they also pass to the display unit D. Thus, the own craft pulses and the other craft pulses to the display unit D are all delayed by a time interval corresponding to the difference signal from the difference computer DCR.

Turning now to the translation drive in bearing "$\theta$," before the drives are applied, a bearing signal from the compass unit C is applied to a constant drive unit $CD\theta$ which functions in the same way as the constant drive unit CDR, and, when the drives are on the signal from the compass unit C is switched from the input of the unit $CD\theta$ to a difference computer $DC\theta$ to which the now constant output of the unit $CD\theta$ is also applied. The output from the unit $DC\theta$ corresponds to the difference in bearing from the position of own craft at switching on, between subsequent positions occupied by own craft at given time intervals, whether or not it changes course, and the positions that would have been occupied by own craft if it had not changed course, just as in the case of the output from the unit DCR for range, the difference in bearing being zero so long as own craft does not change course.

The bearing angles of craft indications in the display unit D must, however, be modified not only to effect the required translational drive in range and bearing $R\theta$ but also to effect the required stabilization of the display in azimuth and for this purpose the difference signal from the computer $DC\theta$ is fed to one input section and, an azimuth stabilization signal derived from the compass C is applied to the other input section, of a differential device DL which provides at its third or output section an output having a translational drive in bearing component and a heading stabilizing component.

In the arrangement shown the rotational or bearing scan in the display unit D is effected by means of a synchro device S which is of differential type and to one input section of which is applied the usual rotational scan signal and to the other input section of which is applied the combined, translational drive in bearing and heading stabilizing, output from the differential device DL, which has the effect of changing the phase relationship of the scan rotation to the rotation of the radar aerial, which is indicated at AE, as required both for the translational bearing drive and for the heading stabilization. The switches clearly shown in FIGURE 5 occupy the positions shown in broken lines on first switching on until the constant drive units CDR and $CD\theta$ are both providing outputs equal to their inputs when all these switches are changed automatically to the positions shown in full lines to apply the drives to the display unit.

I claim:

1. In plan position indicating apparatus for marine or air craft use and having a relative motion display whose reference framework is fixed with respect to own craft in which the apparatus is installed, means for imparting motion to the indications of craft in the display, said means for imparting motion being operable at will to stabilize said reference framework in azimuth on a constant heading the same as an initial heading of own craft and to impart to said reference framework a constant translational velocity the same as an initial translational velocity of own craft, and means affording in the display an indication of own craft.

2. In plan position indicating apparatus for marine or air craft use, means for indicating in the display own craft in which the apparatus is installed, means for producing and imparting at will to the indication of own craft a velocity in accordance with the vectorial difference between own craft's velocity when own craft is maintaining an initial, straight constant-speed course and own craft's velocity when off said initial course, means for adding at will the said difference velocity vectorially to the velocity, when own craft is maintaining said initial course, of the indication of any other craft, and means for imparting at will to the own craft indication and to the indication of any other craft heading stabilizing angular motion in accordance with heading change of own craft but of opposite sense thereto, whereby the display remains unchanged with the own craft indication at the center so long as own craft maintains the said initial course and the indication of own craft as well as the indication of any other craft show at any instant when own craft is off the said initial course the ranges and bearings of the corresponding craft relative to the position which own craft would have occupied at that instant had it not departed from the said initial course.

3. In plan position indicating apparatus for marine or air craft use, means for indicating in the display own craft in which the apparatus is installed and means for effectively imparting at will to the own craft indication and to the indication of any other craft a drive in accordance with the vectorial difference of an initial velocity of own craft and any changed velocity thereof as regards bodily translational motion thereof, and also a drive in accordance with the difference of an initial heading of own craft and any changed heading thereof as regards orientational motion thereof.

4. Plan position indicating apparatus as claimed in claim 1 having means for indicating the heading of own craft.

5. Plan position indicating apparatus at claimed in claim 2, having means for indicating the heading of own craft.

6. Plan position indicating apparatus as claimed in claim 3, having means for indicating the heading of own craft.

7. Plan position indicating apparatus as claimed in claim 1, having a graduated scale surrounding the display, an index associated with said scale and means for effecting relative motion of said scale and index in accordance with heading change of own craft.

8. Plan position indicating apparatus as claimed in claim 2, having a graduated scale surrounding the display, an index associated with said scale and means for effecting relative motion of said scale and index in accordance with heading change of own craft.

9. Plan position indicating apparatus as claimed in claim 3, having a graduated scale surrounding the display, an index associated with said scale and means for effecting relative motion of said scale and index in accordance with heading change of own craft.

No references cited.